Sept. 17, 1957 — R. P. HUTCHINS — 2,806,297
DESOLVENTIZER
Filed Sept. 2, 1955 — 4 Sheets-Sheet 1

INVENTOR.
Ralph P. Hutchins,
BY Parker, Goodman & Farmer,
Attorneys.

Sept. 17, 1957 R. P. HUTCHINS 2,806,297
DESOLVENTIZER
Filed Sept. 2, 1955 4 Sheets-Sheet 3

INVENTOR.
Ralph P. Hutchins,
BY
Parker, Crockmon & Farmer,
Attorneys.

Sept. 17, 1957 — R. P. HUTCHINS — 2,806,297
DESOLVENTIZER
Filed Sept. 2, 1955 — 4 Sheets-Sheet 4

United States Patent Office 2,806,297
Patented Sept. 17, 1957

2,806,297
DESOLVENTIZER

Ralph P. Hutchins, Piqua, Ohio, assignor to The French Oil Mill Machinery Company, Piqua, Ohio Application September 2, 1955, Serial No. 532,357

5 Claims. (Cl. 34—173)

This invention relates to desolventizers for recovering adherent solvent from solvent extracted particles, such as the flakes or meals of seeds which have had their oil and fat previously extracted by solvent extraction. The unit can also be applied to any solid on which the operation of solvent extraction has been performed. Examples of solids that have been processed experimentally or by full plant scale equipment are coffee grounds, alfalfa, spices, rubber, plastics and a number of mineral ores. When the seed treated is cotton seed, for example, special problems arise because of the presence in the flakes of free gossypol that is objectionable when the extracted seed is used for food. When the seeds to be desolventized are soya beans, for example, a different problem arises because conditions of humidity and temperature different from those when treating cotton seed meal are necessary. For flaxseed meal, peanut meal, corn germ meal and other oil seeds, for example, different conditions of treatment in the desolventizers are necessary in order to deliver meal of proper light or dark color. Some oil seeds do not require cooking or toasting at all. In other words, for each oil seed, special temperature and moisture conditions in the desolventizer are necessary in order to deliver the meal in the particular light or dark color which the trade prefers for that meal. The requirements vary for different oil seeds and also vary for the same oil seed in different localities because customers' preferences have been built up. The requirements or desired conditions also vary for other materials, such as mineral ores, for example.

An object of this invention is to provide an improved desolventizer and process for desolventizing flakes, meal and other solvent-extracted materials, that will effectively handle cotton seed meal and deliver it with desired color and moisture conditions, as well as with minimum gossypol content, which may be adjusted to also effectively desolventize any other oil seed meal and deliver it in a desired color and moisture condition, and which will operate continuously and efficiently for long periods of time without plugging of passages with lint and dust.

A further object is to provide an improved desolventizer which may be efficiently and effectively used to desolventize any of a great many of different solids that have been subjected to a solvent-extraction treatment, which may be readily and easily adapted to the treatment of various solvent-extracted materials selectively as desired.

A further object is to provide an improved desolventizer apparatus for accomplishing the above objects efficiently, rapidly and effectively, and which will be relatively simple, compact, durable and inexpensive.

Other objects and advantages will be apparent from the following description of an example or embodiment of the invention, and the novel features will be particularly pointed out hereinafter in connection with the appended claims.

In the accompanying drawings:

Figs. 1 and 1' are vertical, sectional elevations of the upper and lower parts of a desolventizer constructed in accordance with this invention;

Figure 1:
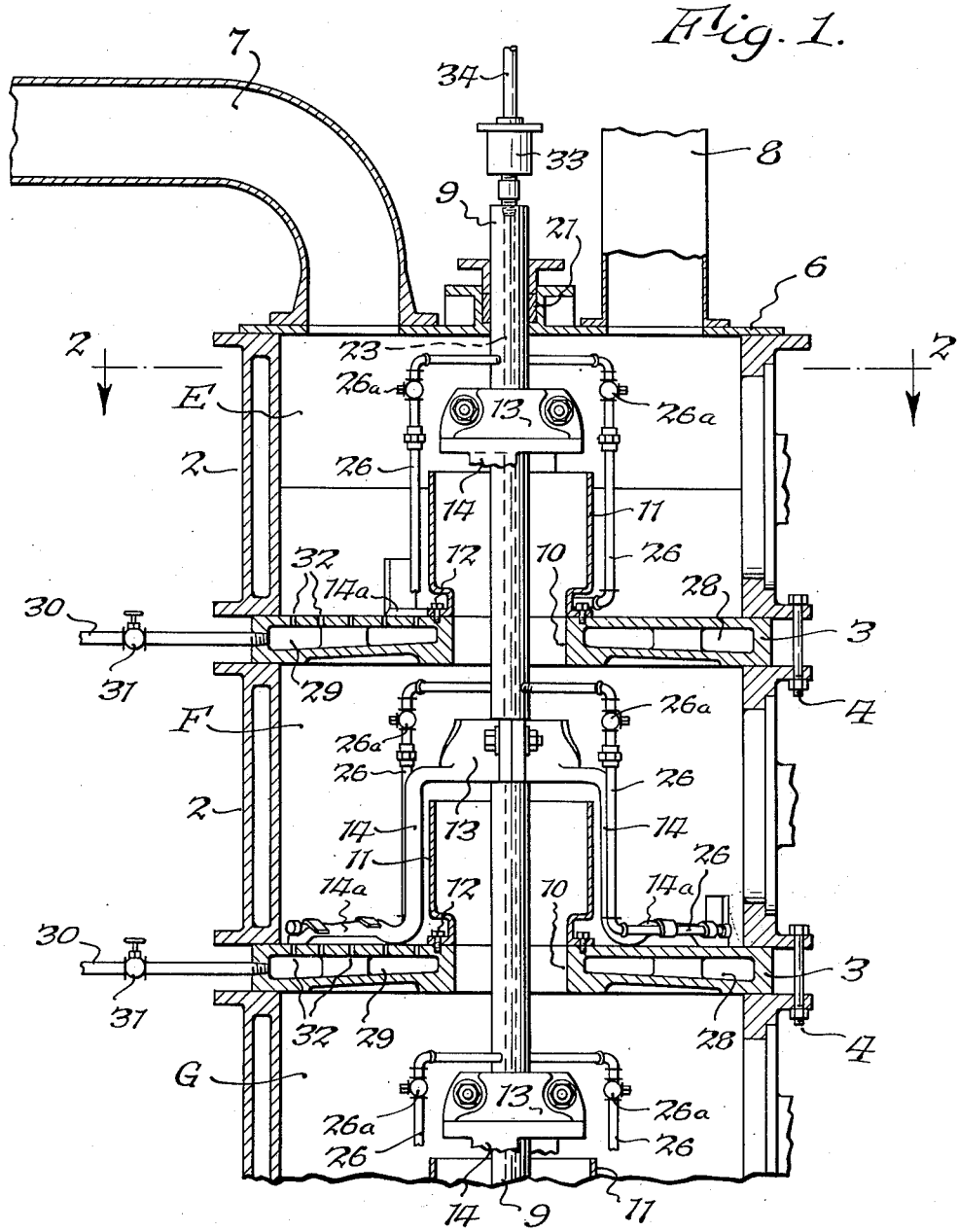
Figure 1:
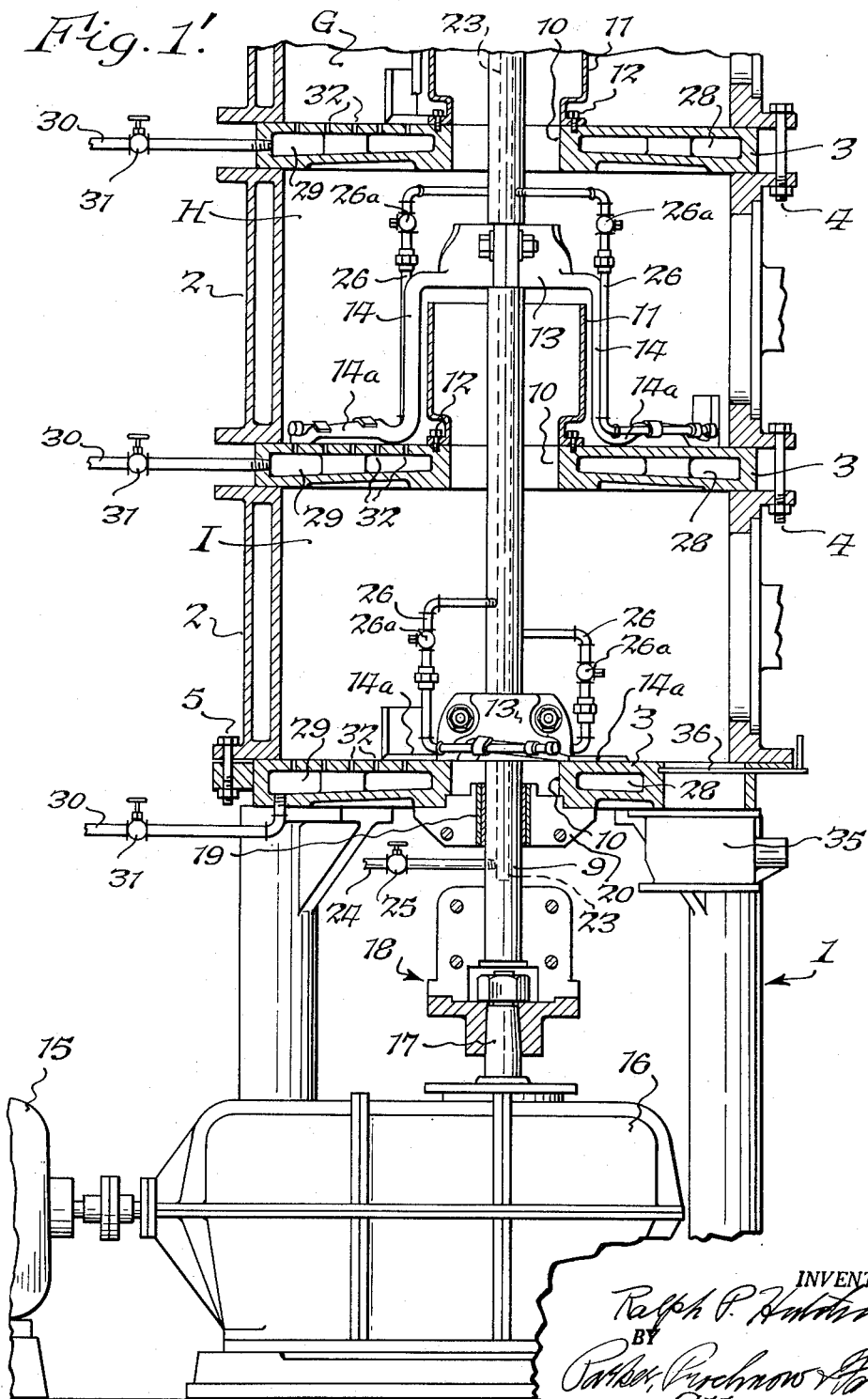

This invention is in the nature of an improvement upon or modification of the desolventizer disclosed in United States Patent No. 2,695,459, issued November 30, 1954, to which reference may be had for further information as to details which are only generally shown and described, or omitted from this specification, because such details are not per se, a part of the particular features of this invention.

In the embodiment of the invention illustrated in Figs. 1–4, the desolventizer is not combined with a toaster, and includes a base frame 1 upon which is mounted a housing formed of a plurality of superposed shells 2, with a floor 3 for each shell, which floor also serves as a ceiling for the chamber of each shell next below it except for the lowermost shell. The adjacent or abutting ends of the shells 2 are coupled by bolts 4 which pass through flanges on the ends of the shells and clamp a floor between them, except that the floor 3 of the lowermost shell is clamped directly to the lower end of that shell by bolts 5. For convenience in reference, the chambers of the shells will be distinguished by the additional reference letters E, F, G, H and I.

The upper end of the top shell 2 is closed by a cover plate 6 having a top vent 7 connected to a source of vacuum and a vapor washer (not shown) through which vapors may be drawn off and condensed for recovery of solvent content outside of the desolventizer. An inlet tube 8 opens through the cover plate 6 near to one side to discharge the meal or other particles to be desolventized into the top portion of the uppermost chamber E. A vertical shaft 9 extends upwardly through the floor of the lowermost chamber I where it has a rotatable and sealed bearing, and thence upwardly in succession through the chambers I, H, G, F and E. In each of the floors between the chambers H and I, G and H, F and G, and E and F, there is a central passage 10 through which the shaft 9 passes with substantial clearance. In other words, the shaft 9 is much smaller in diameter than that of the passage 10 so as to provide a passage along the shaft 9 through those floors from the chamber H to the chamber E.

Figure 2:
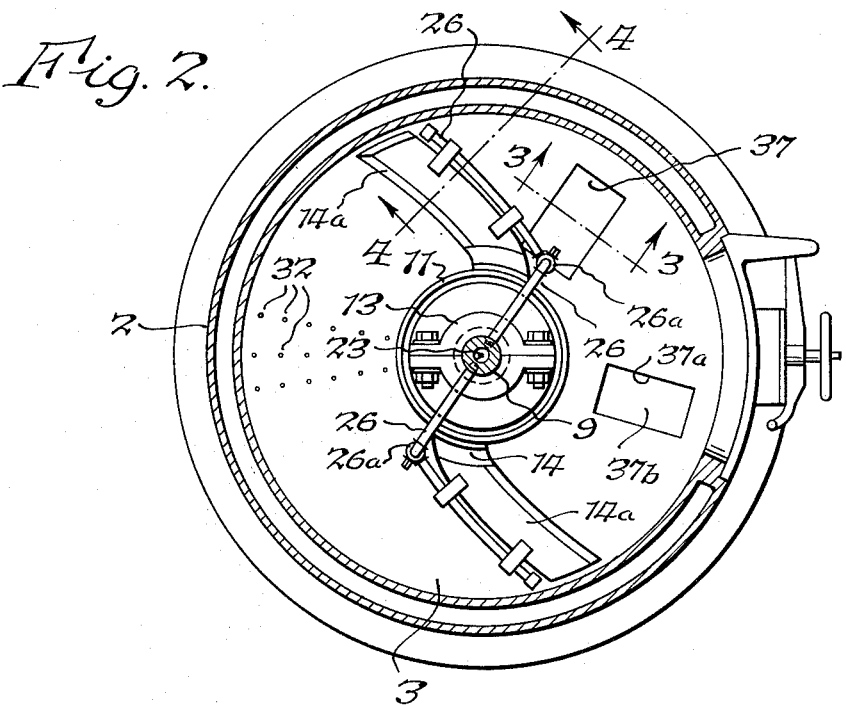
Fig. 2 is a sectional plan of the same, the section being taken approximately along the line 2—2, Fig. 1.
Figure 3:
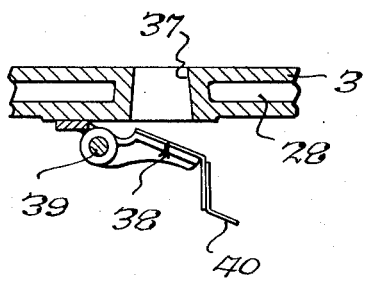
Fig. 3 is a sectional elevation of a part of the same, the section being taken approximately along the line 3 in Fig. 2.
Figure 4:
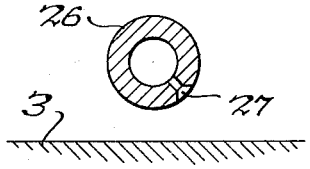
Fig. 4 is a sectional elevation of a detail of the same with the section taken approximately along the line 4—4, Fig. 2.

On each of the same floors between the chambers, an upstanding tube 11 is secured to the floor, such as by screws 12, so as to form an upstanding extension of the passage 10 of that floor. Each tube 11 is open at both ends but is impervious between its ends, and rises in its chamber to a level above the maximum, expected level of particles in that chamber. A hub 13 is fixed on the shaft 9 just above the upper end of each tube 11, and from each hub extend stirrer arms 14 that pass downwardly along the exterior of tube 11 of that chamber to approximately the floor of that chamber, and then across but in close proximity to the floor, as at 14a, to near the side wall of that chamber, as shown in Fig. 2. These arms 14a in each chamber rotate with the shaft 9 and act as stirrer arms that approximately sweep the floor of the chamber and stir the mass of loose particles resting on that floor without breaking the continuity of the upper surface of that mass.

A motor 15 is coupled to and drives a reduction gear device in box 16, and the gear device rotates an upright shaft 17 that is connected by coupling 18 to the lower end of shaft 9 to rotate the latter at a relatively low rate compared to the rate of rotation of the motor shaft. The hub 13 in the chamber I rests on bridges and closes the passage 10 in the floor 3 of chamber I, and arms 14 of that chamber extend from that hub and lie along a floor of that chamber. In the uppermost chamber E, the shaft 9 extends through and is rotatably mounted in a bearing and sealing gland 21 which is supported at the center of the cover plate 6 that is carried on the side wall of the chamber.

The shaft 9 has a passage 23 therein that extends for nearly the entire length, but is closed at its lower end except for a drain vent pipe 24 containing a valve 25, below the chamber I, through which steam condensing in the passage of the shaft 9 may be drained off. The hub 13 in each chamber above the lowermost chamber is disposed just above the upper end of the tube 11 in that chamber so as not to close the upper end of that tube, and pipes 26 in each chamber extend laterally from the shaft 9, just above the hub 13, where they are connected to the passage 23 of the shaft 9, and then down along the outside of the tube almost to the bottom of the chamber, then one branch along the trailing edge of a stirrer arm 14a of that chamber. The portions along the arms 14a have downwardly opening perforations 27 (see Fig. 4), so that live steam may be discharged into the meal in the chamber along the rear or trailing edge of each arm 14a. Each pipe 26 has a valve 26a therein to enable one to control the discharge of steam into each chamber through those pipes.

The floor of each chamber is hollow to provide a steam cavity 28 which extends over nearly all the floor, except for a narrow, radial cavity 29 which is entirely blocked off by partitions from the cavity 28. A steam pipe 30 having a valve 31 therein is connected to each cavity 29, and cavity 28 is connected to live steam by a valve controlled pipe (not shown), usual in cookers and desolventizers. The cavity 29 has small vent openings 32 opening upwardly through the floor so as to discharge live steam upwardly through the bottom of each chamber above the lowermost chamber. Thus, live sparging steam may be discharged into a mass of meal in each chamber to any selected extent by means of the pipes from shaft 9 that extend along the trailing edges of the stirrer arms, or through the rows of vents 32 in the floor, or both. Live steam is supplied to the passage 23 of shaft 9 at the top of the shaft, where that end of shaft 9 is coupled by a swivel coupling 33 to a steam supply pipe 34 that extends outside of the top 6 of the housing.

The floor of chamber I is provided with a discharge chute 35 through which the desolventized meal is discharged at a controlled rate under the control of a suitable gate valve 36 in the chute. The floor of each chamber above the lowermost one is provided with a discharge passage 37, see Figs. 2 and 3, each of which is controlled by a valve 38 (Fig. 3) that moves upwardly against and closes the lower end of its related passage 37. The valve 38 is pivoted at 39 to the lower face of a floor section 3, and its free end has a plate 40 that rides upon the upper level of meal in that chamber, so that when the meal in that chamber reaches a selected depth, which is less than the length of the tube 11, the valve 38 will be held against the lower end of its related passage 37 and close it. When meal is withdrawn from any chamber, the meal level in falling will automatically lower valve 38 at the top of that chamber and admit more fresh meal to bring the meal level back to the selected level. Thus, the level of meal is maintained uniformly and automatically at the desired level. The rate at which the meal passes through the chambers in succession is determined by the rate at which the meal passes through the discharge passage 35. The floor of each chamber above the lowermost one may have one or more vent passages 37a, as in my said Patent No. 2,695,459, but these are ordinarily covered by impervious, but removable plates 37b. The plates 37b are removed only on certain special occasions when extra venting from the chamber may be desired.

In the operation of the device shown in Figs. 1 to 4, the meal to be desolventized is admitted to the uppermost chamber through the inlet conduit or chute 8 under the control of a valve 38 (not shown in Fig. 1, but similar to the valves 38 at the top of each of the other chambers) so that each chamber controls its own meal level automatically. The shaft 9 is rotated and sparging steam admitted to the lower area of each chamber by the pipes following the stirrer arms, or from vents 32 in the floor, or both. The vapors released in each chamber move freely from chamber to chamber upwardly into the upper part of the top chamber E without passing through the meal in chambers above it. All of the released vapors are removed from chamber E through suction applied to vapor outlet 7 and condensed outside of the housing to enable recovery of the solvent from the condensate. The humidity and temperature conditions in each of the various chambers will depend upon the character of the solvent-extracted meal being desolventized.

The illustrated apparatus is particularly applicable to the desolventizing of cotton seed meal, but may be adjusted and operated to treat other seed meal or other materials effectively. In the treatment of cotton seed meal, the solvent-saturated flakes of cotton seed are introduced into the top chamber E and indirect heat is applied to all the chambers through the steam jacketed walls and floors. Live sparge steam is admitted into the top chamber by pipes 26 or vents 32, or both, in a quantity and rate sufficient to give a humidification that would produce a final meal with the desired color and minimum of free gossypol that would be predetermined to be optimum. The meal in this top chamber E would be about 150 degrees F. (when the solvent is hexane) which temperature is maintained in the top and successive chambers as long as some liquid solvent remains in the flakes. If the solvent is not hexane, the temperature would be instead somewhere between the lowest and the highest boiling point of the evaporation range of the azeotropic mixture of the particular solvent being used, and water. The indirect heat from the steam-jacketed walls and floors furnishes some of the heat to evaporate the solvent, the balance being supplied by the live sparging steam admitted into the mass of flakes. The sparging steam condenses in the interior of the mass on the flakes and its released, latent heat of vaporization added to the flakes aids in vaporizing the solvent by the azeotropic principle, and the directly added moisture, by the condensed steam, brings the moisture content of the flakes to the desired content.

In the chambers below the top chamber, after substantially all of the solvent has been evaporated, the temperature is raised progressively from chamber to chamber until a temperature of about 215 degrees F. is reached by the time the flakes reach the bottom chamber I. In the bottom chamber a small amount of live sparging steam is admitted which would pass through the flakes as a vapor and strip off any final traces of solvent. The vapors in each chamber, after rising through the mass or body of flakes in that chamber, will rise to the top of that chamber, and then pass upwardly through the chambers above it in succession by means of the central passages around the shaft 9, without passing through the mass of flakes in chambers above the one in which the vapors were released. From the top chamber the vapors are removed and condensed.

The moisture cycle would start with flakes from the extraction treatment, having about five to ten percent moisture based on the total weight of material, and in the top chamber E this moisture content is raised by the condensation on the flakes of the sparging steam, and by removal of solvent until the flakes have about ten to twenty-five percent moisture, preferably in the range of about fifteen to twenty percent. Some moisture as well as solvent would be removed in the successive chambers, according to the azeotropic laws, and also particularly by means of the sparging steam operating at a temperature above 212 degrees F. in which it acts as a drying gas, so that the final moisture content of the flakes that is discharged from the last chamber I in the series would be about eight to ten percent based on total weight of the material.

Another method of operating on cotton seed flakes with this apparatus would be to utilize no sparging steam at all until the lowermost chamber is reached, and there live steam would be admitted as stripping steam. In this case the solvent-saturated flakes admitted to the chamber E would contain from about five to ten percent moisture based on the total weight of the admitted flakes. The temperature of this chamber E and all the rest of the chambers until the solvent is almost completely recovered would be about 150 degrees F. or the comparable boiling point of any solvent other than hexane. As soon as the solvent is practically all removed, the meats or flakes would be heated rather quickly by means of jacket heat transfer to 215 degrees F. and a final stripping of solvent would be made by live stripping steam. The free gossypol content of the flakes can be reduced by these various procedures from a value of about 0.5% to 1% in the extracted flakes on a solvent-free basis to a value of about 0.2% to 0.015% as discharged from the unit.

In some instances it may be desirable to reduce the gossypol content of the cotton seed flakes by a preliminary cooking and pressing, and in that event the solvent-carrying flakes containing about 0.05% gossypol, and with a moisture and temperature as before, would be introduced into this desolventizing unit, and the solvent could be removed as far as possible by heat transfer from the steam jacketed walls, and then a final stripping of solvent given the flakes at 215 degrees F. with live steam. In every case the moisture would be discharged at a value of around eight to ten percent, although it would be possible if desired to discharge the desolventized flakes from the unit with a higher moisture content and subsequently dry them in another device.

In starting the operating of the desolventizing device or unit, the flakes carrying adherent solvent are introduced into the upper chamber E through inlet passage 8. The valves 38 controlling the passages from chamber to chamber are all closed by temporary holding means, which is old in the art and hence not shown, and sparging steam introduced into the mass of flakes or meal in chamber E either from the pipes 26 that trail the stirrer arms, or from vents 32 in the floor or both. The temperature of the flakes in the chamber E is thus raised to a temperature of about 150 degrees F. when hexane is the solvent, or when another solvent is used, to a temperature below 212 degrees F. but above the normal boiling point of the solvent at about atmospheric pressure, so that the steam will condense in the mass of flakes, and its latent heat released by the condensation will aid the direct heat in vaporizing the solvent, with possibly a little water vapor, which solvent vapor is removed through passage 7 and condensed outside of the unit.

After the desired treatment is given in chamber E, the flakes begin passing through the gate 38 in the floor of chamber E into chamber F, and there the mass of flakes is stirred and heated. This continues until all of the chambers are operating, and then the flakes pass in a stream from chamber to chamber.

It will be observed that one can regulate the addition of moisture and heat in each chamber independently of the other chambers, which makes the unit adaptable to the desolventizing of any meal or loose particles under desired conditions of moisture and temperature. While this desolventizer is particularly designed for the desolventizing of cotton seed flakes or meal, it can be adjusted to desolventize other materials under varying conditions as to temperature and moisture. Even with the same material to be desolventized, the treatment may be varied at will to produce meal with the desired color and other physical characteristics that may be desired.

To obtain flakes or meal of a desired dark color, a large amount of humidification and consequent high moisture during working or toasting is necessary. This is obtained by using maximum sparge steam in the top chamber E. Dark color is usually desirable in soy bean meal, flax seed meal and peanut meal, but a light color is usually desirable in cotton seed meal and corn germ meal. The light color is obtained by removing most of the solvent in the several top chambers by indirect heat, and using only a small amount of sparge steam in one or more of the lower kettles. With the various controls available in this unit, one can regulate the humidity and temperature to give any desired color of the desolventized meal.

A very uniform texture of the meal with a minimum of dust and lint is desirable. With the center passages through tubes 11, there is no place for the dust and lint to collect and plug the passages. Hence this unit can operate for much longer periods without shutting down than those units where the vapors are removed from the chambers by horizontal conduits that provide areas on which dust can collect and build up.

For some materials that have been extracted, the extracted solids, after desolventizing, have little or no value. In such a case jacket steam may be omitted entirely from the process and equipment and the entire desolventizing step accomplished with sparge steam. The discharged solids will then be high in moisture, but will be disposed of.

Figure 6:
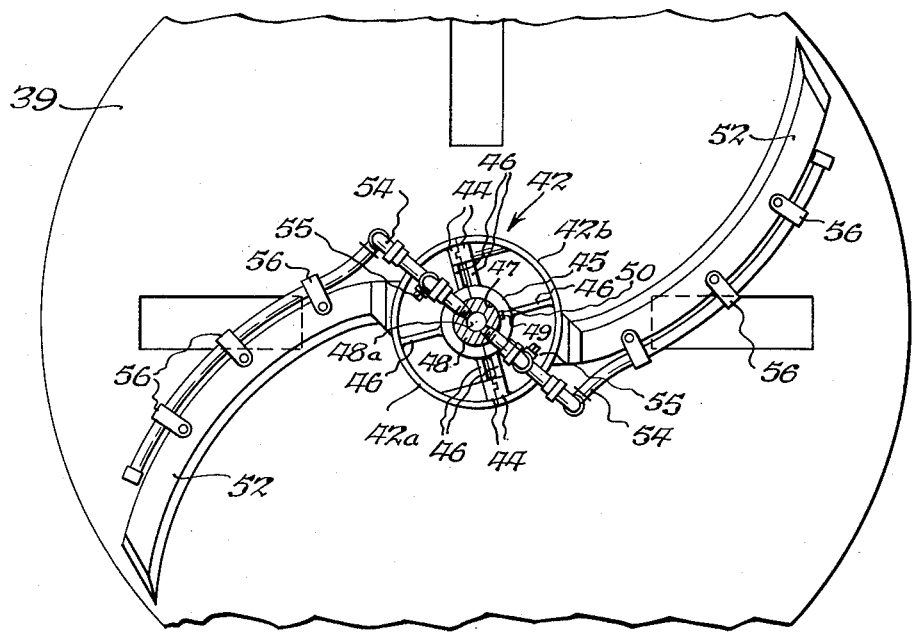
Fig. 6 is a sectional plan of the same with the section taken approximately along the line 6—6 of Fig. 5.
Figure 5:
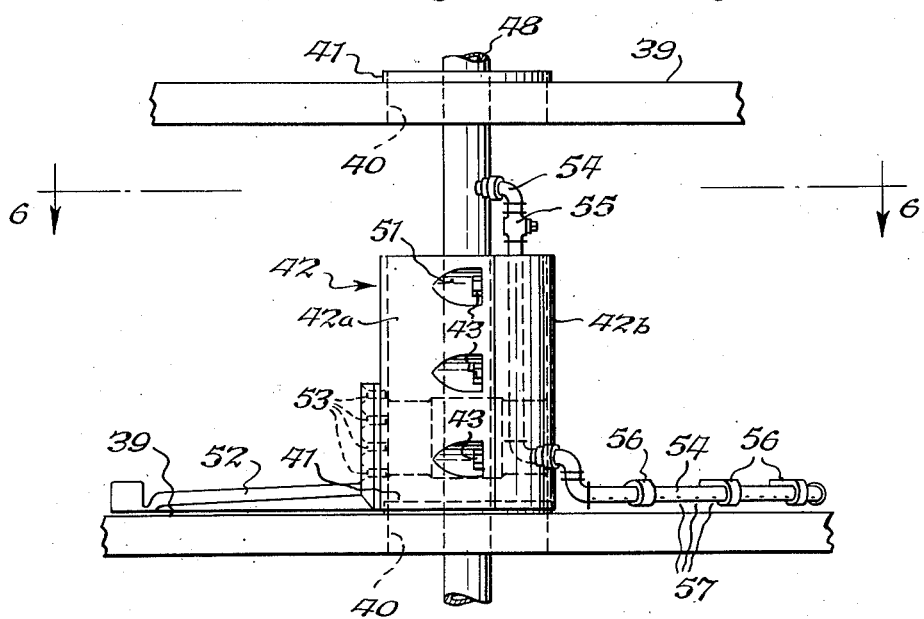
Fig. 5 is a side elevation of the interior of one chamber, with the outer shell removed, of a modified construction embodying a different manner of constructing the central vent and related parts.

In Figs. 5 and 6 is illustrated another manner of forming the central vents between the various chambers, which is preferred for chambers above about 30 inches in diameter, because for the larger size a more rugged construction is preferred. In the modification of Figs. 5 and 6, the floor 39 of a chamber which can be the floor of each chamber E, F, G and H, and corresponds to the floors 3 of those chambers in Figs. 1 to 4, is provided with a central passage 40 which corresponds to a central passage 10 in Figs. 1 to 4. A short cylindrical flange 41 is fixed to the upper face of each floor 40, to border the central passage 40 of that floor, with its central opening forming a short, upward continuation of the passage 40. A large cylinder 42 telescopes downwardly and snugly over the outside periphery of the flange 41 so as to rotate thereon. The opening in cylinder 42 is preferably of the same size as that of flange 41, and hence the lower end of the cylinder 42 is recessed to receive and fit over the flange 41 and rotate on it.

The cylinder 42 is split lengthwise into two sections 42a and 42b (see Fig. 6), which are coupled together in face to face relation at the split, by screws 43 that couple flanges 44 on the insides of the sections that abut each other at the split. A central tube 45 is provided in cylinder 42 and supported centrally by the cylinder 42 by approximately radial arms 46. The tube 45 is also split lengthwise and diametrically, with the split faces of tube 45 in the same planes as those of the split faces of corresponding sections of cylinder 42, so that the tube sections abut face to face in the same manner as the cylinder 42 sections. There are three arms 46 for each tube section, one along each split face, and one about midway between those at the split faces.

The screws 43 serve to hold the tube sections 45 together, as well as couple together the cylinder sections 42a and 42b. The tube 45 has a central passage 47 which tightly fits the central shaft 48 that corresponds to the central shaft 9 of Figs. 1 to 4. The shaft 48 has a central steam passage 48a and a key 49 that is received in a keyway 50 in the passage 47 of tube 45, so that the tube 45 will always rotate with the shaft 48 to which it is clamped and keyed. The walls of sections 42a and 42b of cylinder 42 have recesses 51 opening outwardly to provide a space in which the heads of screws 43 may be received or countersunk.

Stirrer arms 52 are attached to approximately diametrically opposite sides of the cylinder 42, one to each section 42a and 42b. Each arm 52 has an upright section that extends vertically along the side of cylinder 42 and is attached thereto by screws 53 (Fig. 5), and a lower section that extends across the floor in close proximity to it, and toward the circumference of the floor, but with its outer end in the lead of its secured end, as shown in Fig. 6. Pipes 54 are threaded into opposite sides of the shaft so as to communicate with the steam passage in the shaft 48. Each pipe has a valve 55 therein to control passage of steam therethrough, and each pipe 54 beyond its valve, extends downwardly within the cylinder 42 to near the lower end of the cylinder, and then it passes through the peripheral wall of that cylinder, thence along the trailing edge of a stirrer arm 52. Clamps 56 secure each pipe to its related arm 52. The portion of each pipe along an arm 52 has many small discharge orifices 57 (see Fig. 5) that open downwardly for the escape of sparging steam.

The construction of Figs. 5 and 6 provides a central passage for the movement of vapors upwardly from chamber to chamber as in Figs. 1 to 4, but in Figs. 5 and 6, the tube forming the part of the passage above the floor rotates with the central shaft. The ends of the cylinder 42 are open, and the cylinder rises in its chamber above the expected level of solids therein. Otherwise the construction and operation are the same as explained for Figs. 1 to 4.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A desolventizer for solvent extracted material of loose small particles, which comprises a group of closed, steam jacketed kettles arranged in a vertical row in an upright stack, each kettle having a discharge passage for the material in its bottom part, with each kettle above the lowermost one discharging into the upper part of the next lower one, the topmost kettle having an inlet through which material to be processed may be delivered into that kettle, a stirrer shaft extending upwardly through the row of kettles to and into the topmost kettle, a power connection to an end of said shaft for rotating it, a stirrer arm on said shaft in each of said kettles operating in close proximity to the floor thereof for stirring the material in each kettle, each kettle above the lowermost kettle having a closed vapor passage extending from its upper part, around and spaced from said shaft and into the upper part of the kettle next below it, the passage in each kettle being open at its ends and extending from the floor to an extent above the maximum level of material in that kettle to blow the top of said tube, means for admitting live sparging steam into the lower part of selected kettles of said group, well below the level of material therein, said topmost kettle having an outlet in its upper part through which vapors may be withdrawn and condensed, and means controlling the flow of material through said discharge passage of each kettle to maintain a desired level of material in each chamber.

2. A desolventizer for treating solvent extracted materials which comprises a group of closed, steam jacketed kettles superposed upon one another with the floor of each kettle above the lowermost kettle forming the top of the kettle below it, a stirrer shaft extending upwardly through said kettles and into the top kettle, a tube surrounding the shaft and spaced from it in each kettle except the lowermost one and extending from the floor upwardly in each kettle but terminating just below the top of that kettle and open at both ends, a stirrer arm fixed to the shaft in each kettle having one of said tubes, above the upper end of said tube, extending down along said tube to adjacent the floor of that kettle, then in a direction toward the side of that kettle in close proximity to the floor, said floor in each kettle with a tube in the area within the tube and around said shaft, having a vapor passage from face to face therethrough for the flow of vapors upwardly from kettle to kettle, the floor of each kettle also having a gate controlled passage exteriorly of said tube for passing said materials by gravity from kettle to kettle until the bottom kettle, and then discharging from the bottom kettle, and controlling the level of material in each kettle to below the top of said tube, means for admitting live steam into the bottom part of the chambers of selected ones of said kettles well below the level of said materials therein, said steam admitting means including a pipe with apertures along its length, extending along the trailing edge of said stirrer arm and moving therewith, means for delivering materials to be desolventized to the upper part of the top kettle of the group, and means connected to the upper part of the top kettle for withdrawing vapors and condensing them exteriorly of the group of kettles.

3. A desolventizer for treating solvent extracted materials which comprises a group of closed, steam jacketed kettles superposed upon one another with the floor of each kettle above the lowermost kettle forming the top of the kettle below it, a stirrer shaft extending upwardly through said kettles and into the top kettle, a tube surrounding the shaft and spaced from it in each kettle except the lowermost one and extending from the floor upwardly in each kettle but terminating just below the top of that kettle and open at both ends, a stirrer arm fixed to the shaft in each kettle having one of said tubes, above the upper end of said tube, extending down along said tube to adjacent the floor of that kettle, then in a direction toward the side of that kettle in close proximity to the floor, said floor in each kettle with a tube, in the area within the tube and around said shaft, having a vapor passage from face to face therethrough for the flow of vapors upwardly from kettle to kettle, the floor of each kettle also having a gate controlled passage exteriorly of said tube for passing said materials by gravity from kettle to kettle until the bottom kettle, and then discharging from the bottom kettle, and controlling the level of material in each kettle to below the top of said tube, means for admitting live steam into the bottom part of the chambers of selected ones of said kettles well below the level of said materials therein, said steam admitting means including discharge orifices spaced apart in the floor of each of said selected ones of said kettles and opening upwardly into the chamber of that kettle to discharge live steam upwardly into the mass of materials disposed thereover, means for delivering materials to be desolventized to the upper part of the top kettle of the group, and means connected to the upper part of the top kettle for withdrawing vapors and condensing them exteriorly of the group of kettles.

4. A desolventizer for treating solvent extracted materials which comprises a group of superposed kettles, having a gate controlled discharge passage in the floor of each for passing said materials from kettle to kettle by gravity, and then final discharge from the lowermost kettle, a shaft passing upwardly in each of said kettles to and into the top kettle, the adjacent kettles having a vapor passage between them around the shaft, a tube extending upwardly from adjacent the floor of each kettle above the lowermost one of the group, surrounding and forming an upward extension of that vapor passage in each kettle, and rising above the maximum expected level of materials therein and open at its upper end, whereby there will be a vapor passage along the shaft from the upper part of each kettle below the top kettle to the upper part of the kettle next above it, means operable by said shaft in each kettle above the lowermost kettle, and having an arm extending downwardly in the kettle to approximately the floor of that kettle, then along the floor of that kettle approximately to the peripheral upright wall of that kettle, means for introducing live steam into each of selected kettles adjacent the floor thereof and below the upper level of materials resting on the floor, said steam introducing means including upwardly opening, steam discharge orifices in the floor of each of the selected kettles, and also steam pipes with apertures therein at spaced intervals along and close to the trailing edge of the stirrer arm in that kettle, means for introducing fresh materials to be processed into the upper part of the top kettle, and means for removing vapors from the upper part of the top kettle to be condensed outside of said top kettle.

5. A desolventizer for solvent treated material of loose, small particles which comprises a group of closed kettles arranged at successively lower levels, with a discharge passage in the bottom of each kettle, and with the discharge passages above the lowermost kettle opening into the top of the kettle next below it in said succession, a gate controlling each of said discharge passages, means controlling each of said gates above the lowermost kettle and operable to maintain automatically a selected depth of particles in that kettle, means for discharging solids to be treated into the top of the uppermost kettle, means in each kettle and moving solely in close proximity to the floor thereof for stirring the particles in that kettle, said kettles below the uppermost kettle having vapor vent conduits leading from the upper part of each kettle to the upper part of the kettle next above it, each of said vapor vent conduits being open solely at its ends and at its upper end terminating above the level of solids in that kettle, means for maintaining selected temperatures in said kettles and variable in successive kettles, by indirect heat and sparging steam, the steam being introduced into the lower part of the mass of solids in any kettle below the upper, unbroken level of said solids of that kettle, means for removing the vapors from the upper part of the uppermost kettle for condensation and recovery of solvent outside of said kettles.

References Cited in the file of this patent
UNITED STATES PATENTS

| | | |
|---|---|---|
| 151,640 | Wheelwright | June 2, 1874 |
| 273,767 | Schroeder | Mar. 13, 1883 |
| 351,432 | Free et al. | Oct. 26, 1886 |
| 2,283,641 | Martin et al. | May 19, 1942 |
| 2,695,459 | Hutchins | Nov. 30, 1954 |
| 2,778,123 | Kurtz | Jan. 22, 1957 |